US009692303B2

(12) United States Patent
Morroni

(10) Patent No.: US 9,692,303 B2
(45) Date of Patent: Jun. 27, 2017

(54) SYSTEMS AND METHODS OF NON-INVASIVE CONTINUOUS ADAPTIVE TUNING OF DIGITALLY CONTROLLED SWITCHED MODE POWER SUPPLY BASED ON MEASURED DYNAMIC RESPONSE

(71) Applicant: Texas Instruments Incorporated, Dallas, TX (US)

(72) Inventor: Jeffrey Anthony Morroni, Highlands Ranch, CO (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/947,495

(22) Filed: Nov. 20, 2015

(65) Prior Publication Data

US 2017/0149335 A1 May 25, 2017

(51) Int. Cl.
*H02M 3/158* (2006.01)
(52) U.S. Cl.
CPC .................... *H02M 3/158* (2013.01)
(58) Field of Classification Search
CPC ...................................................... H02M 3/158
See application file for complete search history.

(56) References Cited

U.S. PATENT DOCUMENTS

| 2009/0267582 | A1* | 10/2009 | Prodic ................... | H02M 3/157 323/283 |
| 2012/0200331 | A1* | 8/2012 | Karlsson ............... | H02M 3/156 327/175 |
| 2015/0029760 | A1* | 1/2015 | Karlsson ................ | H02M 1/08 363/17 |

* cited by examiner

Primary Examiner — Emily P Pham
(74) Attorney, Agent, or Firm — John R. Pessetto; Charles A. Brill; Frank D. Cimino

(57) ABSTRACT

Example embodiments of the systems and methods of non-invasive continuous adaptive tuning of digitally controlled switched mode power supply based on measured dynamic response disclosed herein rely on time domain measurements for the tuning rather than on frequency response to automatically tune the system for stability and good dynamic performance. In particular, an algorithm directly measures overshoot and settling time to transients. Using this information, the algorithm minimizes both overshoot/undershoot and settling time by adjusting the parameters of a digital compensator. Since time domain measurements are directly used, the implementation does not require an additional perturbation in the system that otherwise would be necessary.

6 Claims, 7 Drawing Sheets

SYSTEMS AND METHODS OF NON-INVASIVE CONTINUOUS ADAPTIVE TUNING OF DIGITALLY CONTROLLED SWITCHED MODE POWER SUPPLY BASED ON MEASURED DYNAMIC RESPONSE

TECHNICAL FIELD

The present disclosure is generally related to electronics and, more particularly, is related to power management.

BACKGROUND

A switched mode power supply (power converter, SMPS) as provided in FIG. 1 is an electronic power supply that incorporates switching regulator 110 to convert electrical power efficiently. Like other power supplies, an SMPS transfers power from source 120, for example, mains power, to load 130, such as a personal computer, while converting voltage and current characteristics. Unlike a linear power supply, pass transistor 140 of a switched mode power supply continually switches between low-dissipation, full-on and full-off states, and spends very little time in the high dissipation transitions, which minimizes wasted energy. Ideally, a switched mode power supply dissipates no power. Voltage regulation is achieved by varying the ratio of on-to-off time. In contrast, a linear power supply regulates the output voltage by continually dissipating power in the pass transistor. This higher power conversion efficiency is an important advantage of a switched mode power supply.

Switching regulators may be used as replacements for linear regulators when higher efficiency, smaller size or lighter weight are required. They are, however, more complicated; switching currents can cause electrical noise problems if not carefully suppressed, and simple designs may have a poor power factor.

In an SMPS, the output current flow depends on the input power signal, the storage elements and circuit topologies used, and also on the pattern used (e.g., pulse-width modulation with an adjustable duty cycle) to drive the switching elements. The spectral density of these switching waveforms has energy concentrated at relatively high frequencies. As such, switching transients and ripple introduced onto the output waveforms may be filtered.

Although a switching power supply may offer greater efficiency, disadvantages include greater complexity, the generation of high-amplitude, high-frequency energy that the low-pass filter must block to avoid electromagnetic interference (EMI), a ripple voltage at the switching frequency and the harmonic frequencies thereof.

A power converter's transient performance is subject to uncertainties and non-idealities in the components and controller. These non-idealities can deteriorate response to dynamic changes in the system and/or cause the system to approach instability. Prior art solutions to this problem have included automatic one-time or continuous adjustment of the control parameters based on frequency response techniques. There are heretofore unaddressed needs with these previous solutions.

SUMMARY

Example embodiments of the present disclosure provide systems of non-invasive continuous adaptive tuning of digitally controlled switched mode power supply based on measured dynamic response. Briefly described, in architecture, one example embodiment of the system, among others, can be implemented as follows: a switch mode power supply (SMPS) controller; and an adjustable compensator configured to receive time domain information based on a measured transient of an output voltage of an SMPS controlled by the SMPS controller and to send a compensation signal to the SMPS controller to compensate for the transient on the output voltage.

Embodiments of the present disclosure can also be viewed as providing methods for non-invasive continuous adaptive tuning of digitally controlled switched mode power supply based on measured dynamic response. In this regard, one embodiment of such a method, among others, can be broadly summarized by the following steps: providing an output voltage with a switch mode power supply (SMPS), the SMPS comprising an SMPS controller; receiving information related to time domain transients on the output voltage; and sending an adjustable compensation signal to the SMPS controller to adjust for the transients on the output voltage.

Embodiments of the present disclosure can also be viewed as providing circuits for non-invasive continuous adaptive tuning of digitally controlled switched mode power supply based on measured dynamic response. In this regard, one embodiment of such a method, among others, can be broadly summarized by the following elements: a switch mode power supply (SMPS) circuit configured to provide a regulated output voltage, the SMPS circuit comprising: a controller configured to control the regulation of the output voltage, the controller comprising an adjustable compensator configured to receive information based on a time domain transient on the regulated output voltage and to adjust a pulse width modulation signal used to regulate the output voltage based on the received information on the time domain transient

DETAILED DESCRIPTION

Figure 1:
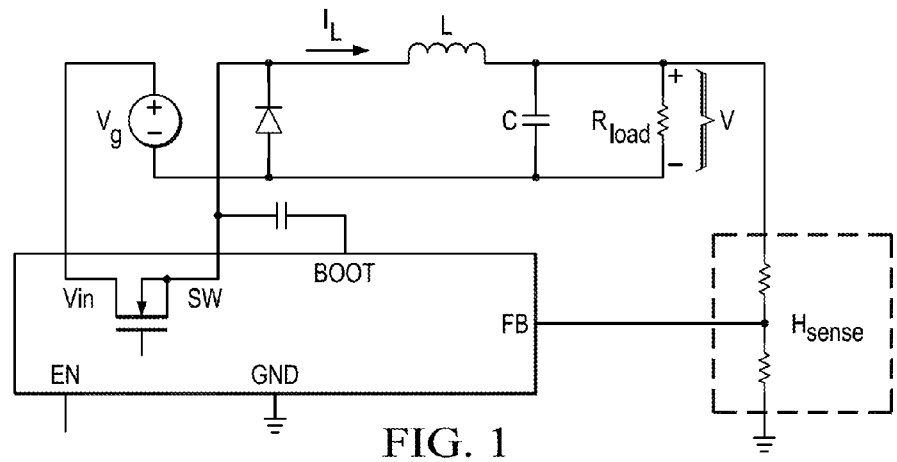
FIG. 1 is a circuit diagram of a switched mode power supply (SMPS).

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Example embodiments of the systems and methods of non-invasive continuous adaptive tuning of digitally controlled switched mode power supply based on measured dynamic response disclosed herein rely on time domain measurements for the tuning rather than on frequency response to automatically tune the system for stability and good dynamic performance. In particular, an algorithm directly measures overshoot and settling time to transients. Using this information, the algorithm minimizes both overshoot/undershoot and settling time by adjusting the parameters of a digital compensator. Since time domain measurements are directly used, the implementation does not require an additional perturbation in the system that otherwise would be necessary as in previous solutions.

In particular, example embodiments of the systems and methods disclosed herein rely on transients already present in the system (that is, load, line, or reference transients). Using transients already present in the system presents the ability to tune based on parameters that affect end equipment performance (time domain response) while not requiring any additional signal injections into the system. Example embodiments disclosed herein do not require any perturbation in the system other than those that are already present (load, line, and reference transients as non-limiting examples). Previous solutions have relied on tuning the frequency domain response of the power supply, which has non-ideal translation to time domain responses.

In designing a switching power supply, the selected values of inductance and capacitance may vary greatly. One designer may select a capacitor at one microfarad and another may select one milli-farad. Additionally, the inductance choice may vary greatly from design to design. Even if an appropriate inductance value is selected, the tolerance of that value may vary by plus or minus 20-30%; similar issues apply to the capacitance and even to the capacitor equivalent series resistance (ESR). Additionally, even if all of the initial parameter values are known, the capacitor values may vary as much as 30% over time with capacitor ESR varying as much as 200% due to aging of components in the field. If all of these factors are combined, the implications are that, in regards to the dynamics of the converter, the ability to regulate the output voltage with changes in input voltage and load current is significantly degraded. Additionally, due to a potentially wide input operating range, the control loop is often conservatively designed such that stability may be maintained. A conservative design compensates for the wide variations of inductance, capacitance and capacitor ESR over time.

Figure 2:
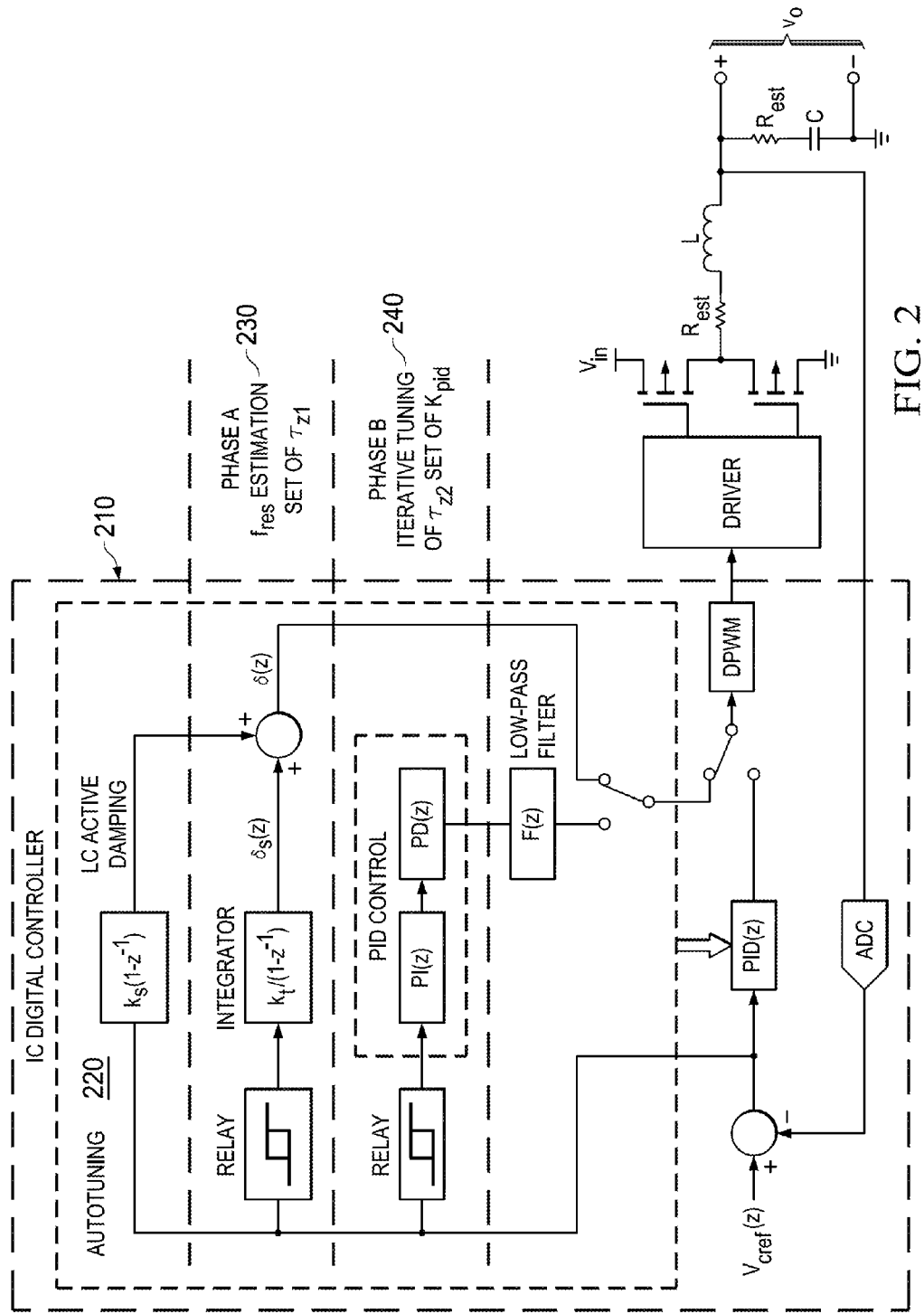
FIG. 2 is a circuit diagram of an SMPS with one-time, startup tuning.
Figure 3:
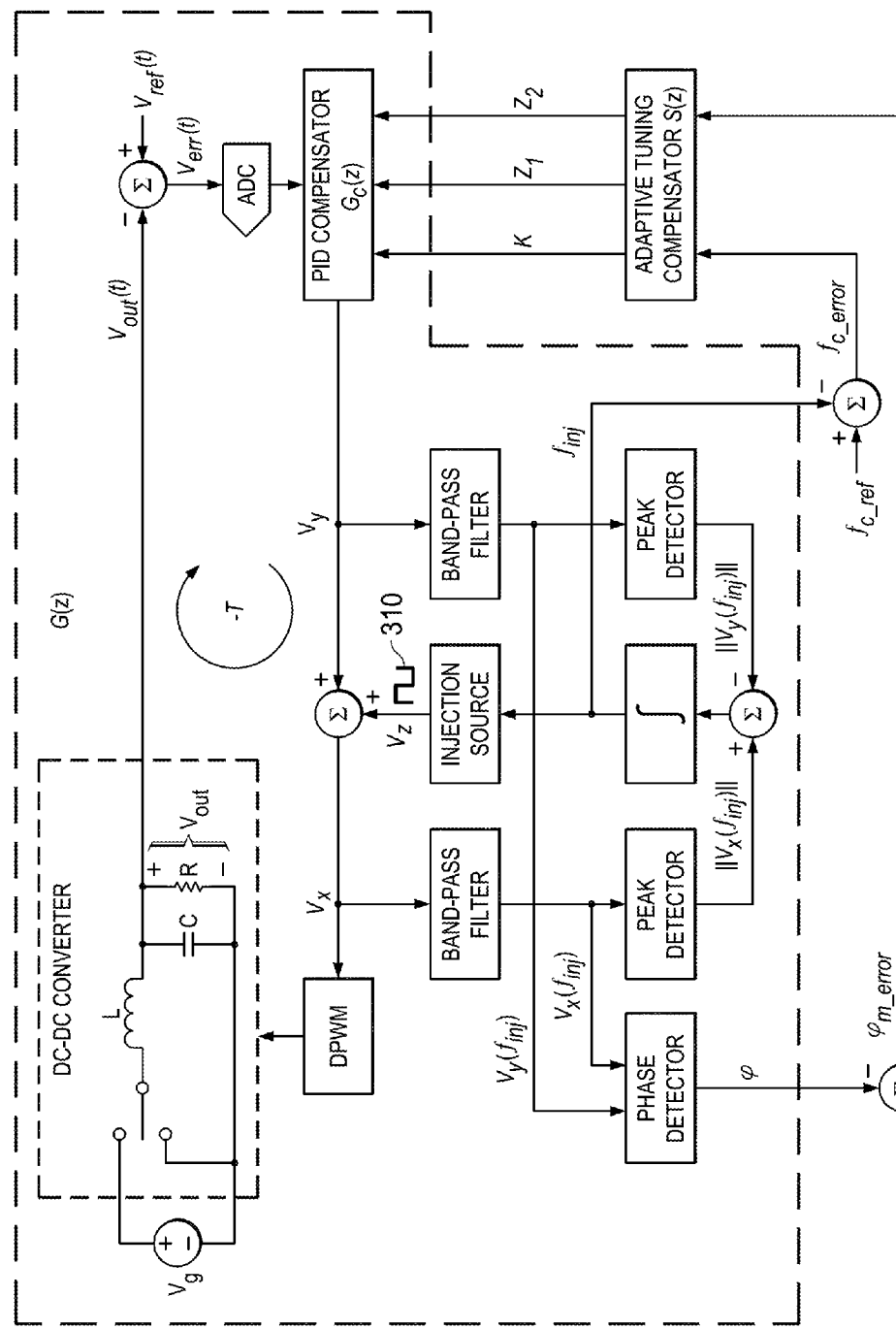
FIG. 3 is a circuit diagram of an SMPS with continuous tuning based on an external perturbation signal.

Previous mitigation techniques include circuits of FIG. 2 and FIG. 3. In the circuit of FIG. 2, the feedback loop is designed to be slow to produce a fixed feedback loop compensation network. The slow response enables handling of wide parameter variations. Controller 210 provides a single tuning instance on startup. Since it only tunes the system upon startup, it cannot account for variations over time and the processing can be complicated. It also has an inherent disadvantage of requiring additional capacitance to remain within the output band overload transients.

In another previous solution with auto-tuning in which, upon startup, the parameters of the control loop are tuned by compensating based on the reaction of some measured parameters in the system to a signal injected into the converter on startup. In this solution, some attributes about the system are measured to induce some information about the inductance and capacitance parameters of the converter on startup. Signal processing techniques are used to select a compensator value that would be appropriate for the measured values on startup. Disadvantages of this technique include operation only on startup or during periodic intervals. Without continual compensation, parameter variations over time are not effectively managed. Another disadvantage to this technique is the use of an injected signal that is not normally in the system. This injected signal may cause additional output voltage ripple and requires additional complicated processing.

The circuit of FIG. 3 provides another previous solution, which involves continuous tuning during operation of the converter. The continuous tuning has some similar results. It measures values of the system and continually adjusts the parameters of the control loop in reaction to those measured values. This solution solves some of the problems with respect to component variations due to aging, to parameter uncertainty upon startup, and to component selection. However, it has similar drawbacks as it requires an external perturbation. A signal, such as square wave 310, is injected into the feedback loop. That perturbation signal is used to tune the system, while resulting in some undesired ripple on the output. It also requires some additional complicated processing.

Figure 4:
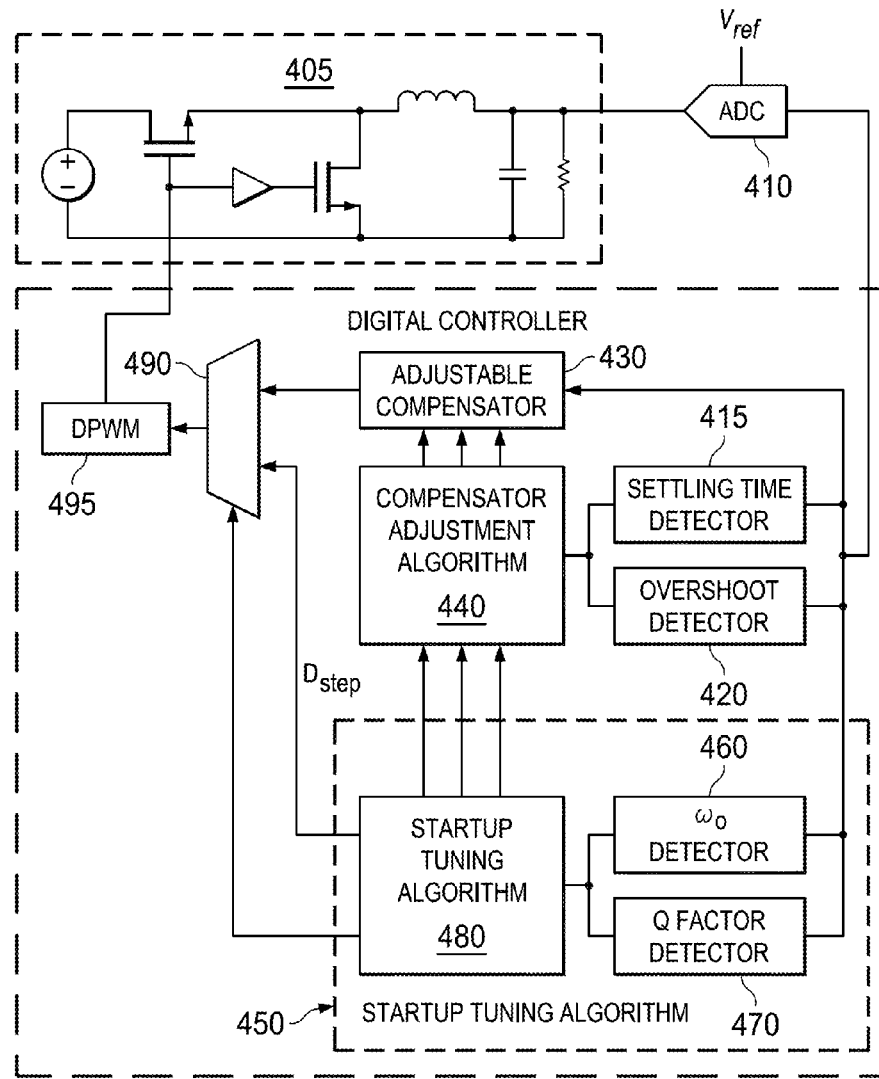
FIG. 4 is a circuit diagram of an example embodiment of a system of non-invasive continuous adaptive tuning of digitally controlled switched mode power supply.

As provided in FIG. 4, an example embodiment of the systems and methods of non-invasive continuous adaptive tuning of digitally controlled switched mode power supply based on measured dynamic response disclosed herein implements a control loop (digital or analog) that measures output voltage 408 of SMPS 405 and adjustable compensator 430 to adjust the parameters of the feedback loop. When an output load transient occurs, for example, output voltage 408 exhibits an overshoot or an undershoot, a natural measureable transient of the system. Output voltage 408 may be converted by analog to digital converter 410 for measurement of the transient information by settling time detector 415 and overshoot detector 420 (measures overshoot and undershoot). The transients and the response to those transients are used to tune the load step response. Instead of injecting a signal and using some complicated processing, example embodiments use the transient information to tune the transient response. When a load step occurs, the overshoot or undershoot and the settling time are measured based on the natural load transient.

In example embodiments, compensator adjustment algorithm module 440 adjusts the parameters of adjustable compensator 430 in a way that optimizes it for the next load transient. As more load transients occur, the controller becomes more optimized. After a certain number of transients occur, the algorithm produces an approximation of an optimum load step response. No external perturbation is used and the processing is simple.

In example embodiments, the system uses a number of iterations which may result in a delay in approaching an optimum load step. At startup, the very first transient response may not be ideal. To compensate for this delay, optional startup tuning algorithm module 480 may inject an atypical startup tuning signal that induces a small step response. This step response is measured and induces parameters that may be used for startup. The startup tuning signal parameters may be provided by $\omega_0$ detector 460 and Q factor detector 470. Q factor detector 470 and $\omega_0$ detector 460 detect the open loop converter frequency response. If a small step is injected in the duty cycle, the output will ring. The ringing depends on the Q and the $\omega_0$ of the power converter. Adjustment signals are sent from startup tuning algorithm module 480 and adjustable compensator 430 to multiplexer 490, which sends a final adjustment signal to pulse width modulator 495 for regulating the output of SMPS 405. A first signal from startup tuning algorithm module 480 to multiplexer 490 is the output of startup tuning algorithm module 480. A second signal from startup tuning algorithm module 480 to multiplexer 490 indicates to multiplexer 490 when the startup tuning process is completed and switches the mux inputs. After startup, compensator adjustment algorithm module 440 uses the measurements from settling time detector 415 and overshoot detector 420 to fine-tune the response.

Figure 5:
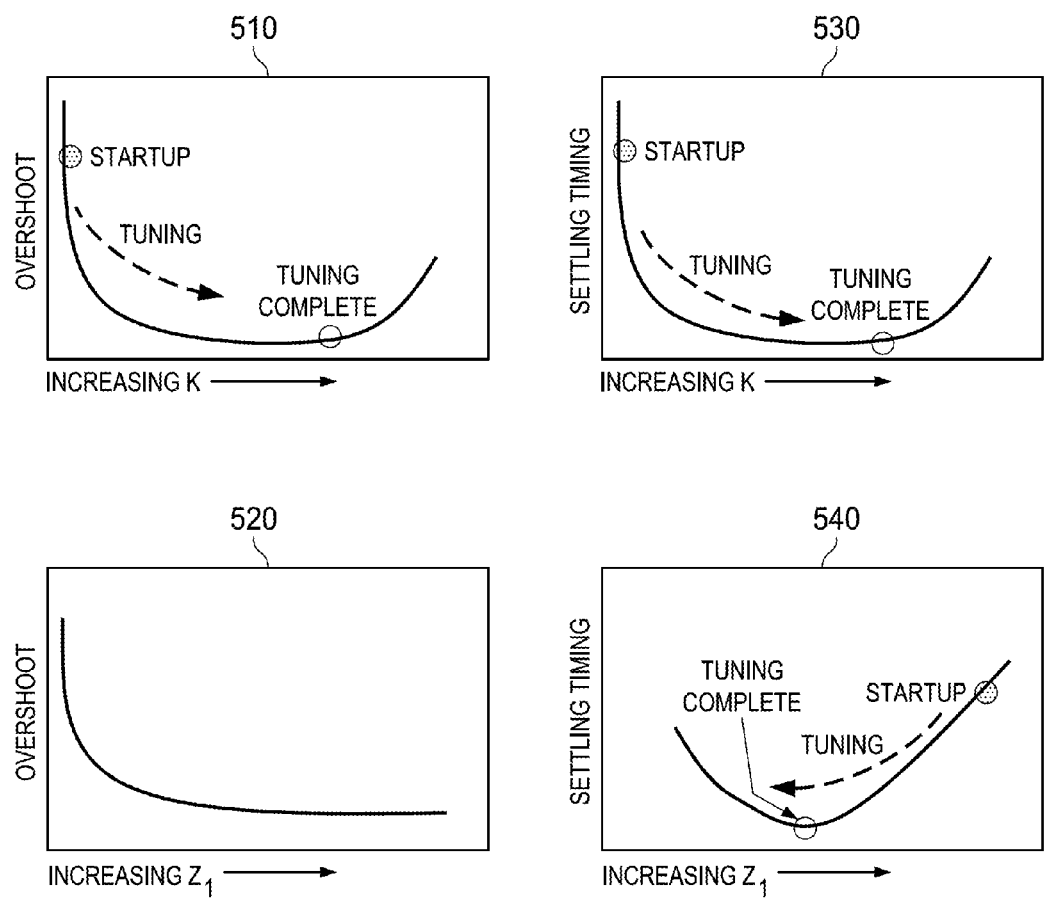
FIG. 5 provides signal diagrams for tuning example embodiments of the system of FIG. 4.

FIG. 5 provides signal diagrams of the effects on overshot and settling time due to changes in gain and zero of the loop response. In signal diagram 510, gain K is increased until the optimum overshoot is reached. Signal diagram 520 demonstrates that a change in the zero location of the response loop has a small effect on the overshoot. In signal diagram 530, gain K is increased until the optimum settling time is reached. In signal diagram 510, the zero location of the response loop is decreased until the optimum settling time is reached. In adjusting the response to the transients, increasing the gain or decreasing the location of the zero in the response loop will decrease the overshoot while increasing the bandwidth of the response. At some point while increasing the gain, a minimum overshoot may be reached. If the gain is increased beyond that point, the phase margin of the loop response is decreased, which results in increasing the overshoot. The minimum overshoot tracking algorithm determines the point at which increasing the gain results in a minimum overshoot. A similar algorithm is used for the settling time. Although both the overshoot and the settling time are a function of the gain, only the settling time is affected by adjusting the zero point of the response loop.

The overshoot or undershoot is measured (or the settling time), optionally starting at a point based on the startup tuning algorithm. Then, the gain is increased and the zero location is decreased. When the next transient occurs, if the overshoot and settling time of this next transient is improved then the adjustment is proceeding correctly. This process may be performed iteratively until the minimum overshoot/undershoot (or settling time) is reached as previously discussed. The time it takes to reach the minimum overshoot (or settling time) may depend on the size of the steps in the adjustment algorithm. If the gain increase is relatively large, approaching the minimum overshoot may occur relatively quickly; however, referring back to signal diagram 510, the overshoot may also oscillate between a point on the very far left on the overshoot curve and a point on the very far right of the overshoot curve. The step size may be chosen such that it is as large as possible, while still able to approach the minimum point.

Figure 6:
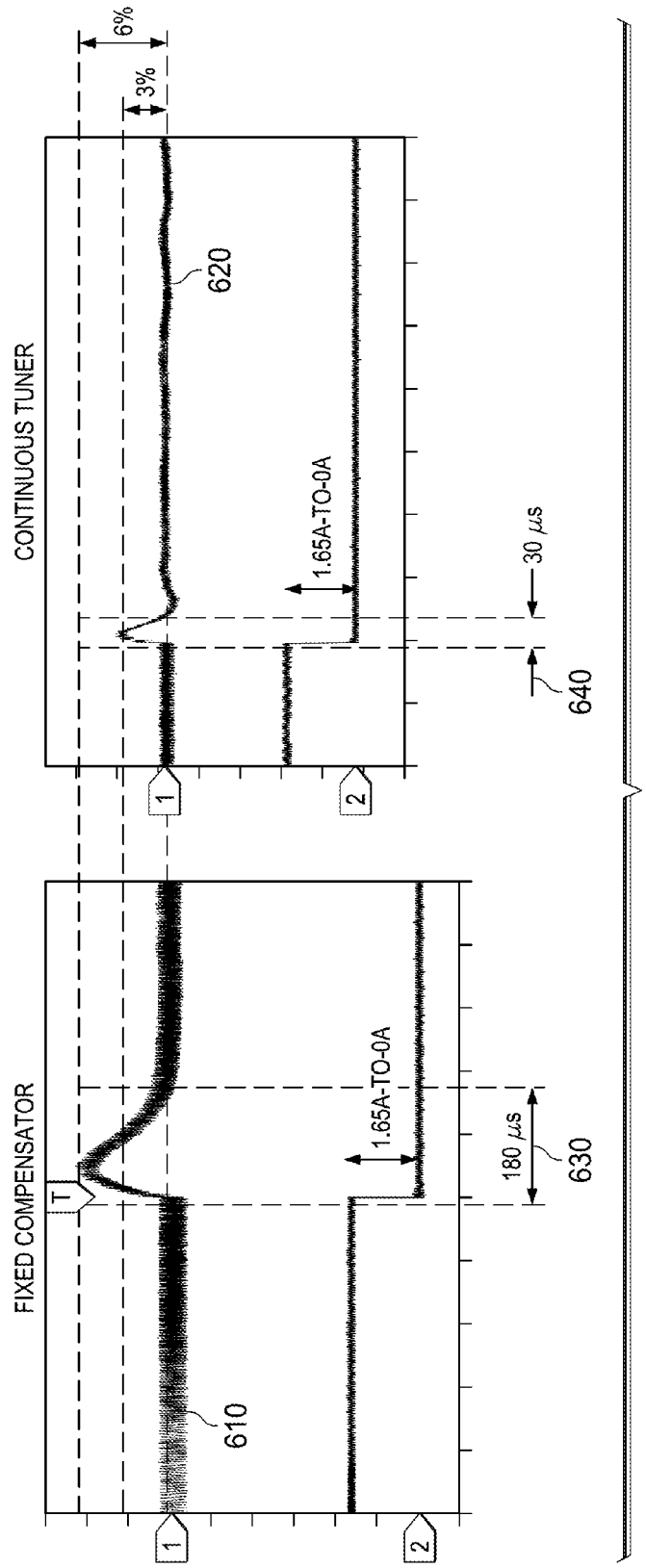
FIG. 6 is a signal diagram comparing the results of tuning with a fixed compensator and with example embodiments of the system of FIG. 4.

FIG. 6 provides a signal diagram of a comparison of the transients between using a fixed compensator, shown on the left, and using the example embodiments of the system disclosed herein, shown on the right, when a 1.65 A load step occurs on the output. Example embodiments of the system disclosed herein provide a reduction of fifty percent of the overshoot over using the fixed compensator on the left. Example embodiments of the system disclosed herein also result in over an eighty percent reduction in settling time.

Figure 7:
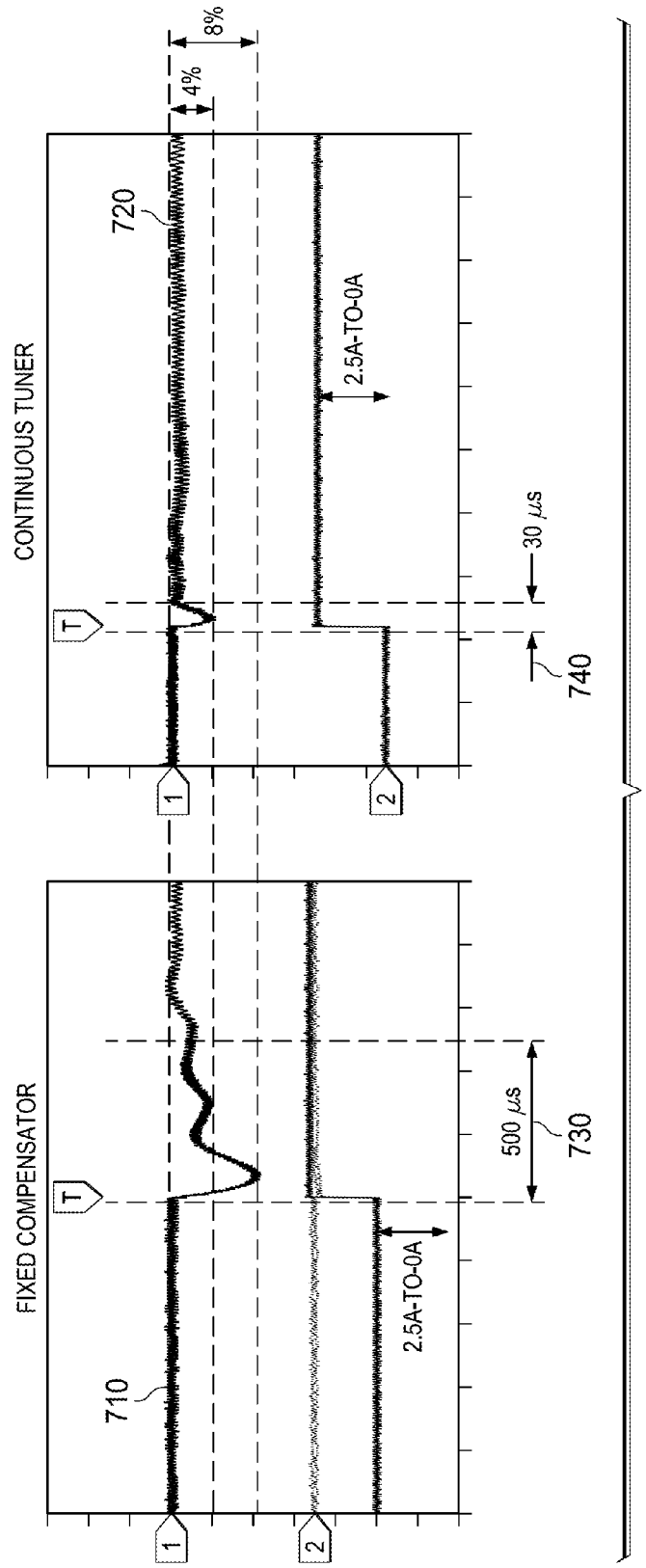
FIG. 7 is a signal diagram comparing the results of tuning with a fixed compensator and with example embodiments of the system of FIG. 4.

FIG. 7 provides a signal diagram of a comparison of the transients between using a fixed compensator, shown on the left, and using the example embodiments of the system disclosed herein, shown on the right, when a 2.5 A load step occurs on the output. Example embodiments of the system disclosed herein provide a reduction of fifty percent of the undershoot over using the fixed compensator on the left. Example embodiments of the system disclosed herein also result in a ninety-four percent reduction in settling time.

Figure 8:
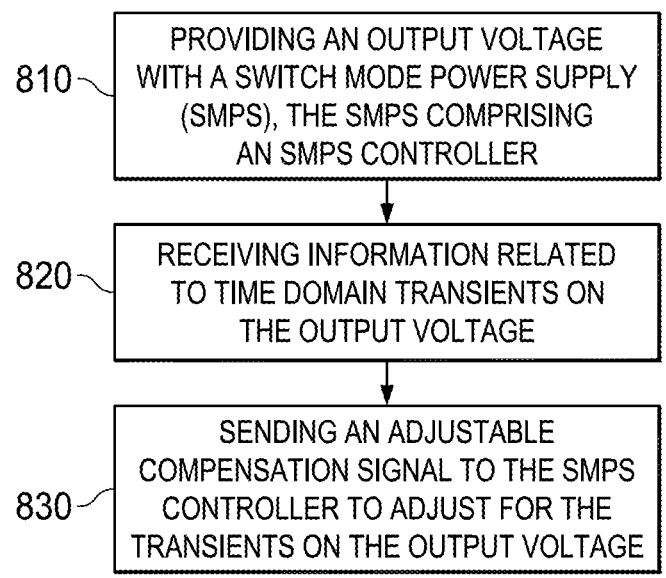
FIG. 8 is a flow diagram of an example embodiment of a method non-invasive continuous adaptive tuning of digitally controlled switched mode power supply.

FIG. 8 provides a flow diagram of an example embodiment of a method of non-invasive continuous adaptive tuning of digitally controlled switched mode power supply based on measured dynamic response. In block 810, an output voltage is provided with a switch mode power supply (SMPS), the SMPS comprising an SMPS controller. In block 820, information related to time domain transients on the output voltage is received. In block 830, an adjustable compensation signal is sent to the SMPS controller to adjust for the transients on the output voltage.

Example embodiments of the systems and methods of non-invasive continuous adaptive tuning of digitally controlled switched mode power supply based on measured dynamic response disclosed herein uses a simple algorithm which accounts for parameter variations on startup and over time. Example embodiments are easy to implement and are hardware efficient. No external perturbation is introduced to the system. The compensator adjustment algorithm tunes the response based on a key performance parameter, such as the dynamic performance, whereas other algorithms tune based on parameters such as phase margin and crossover frequency, for example. Phase margin and crossover frequency are frequency response based considerations. Although phase margin and crossover frequency have a correlation to time domain measurements of overshoot and settling time, the actual overshoot and settling time are key performance parameters. Example embodiments disclosed herein adjust based directly on those key performance parameters.

The flow chart of FIG. 8 shows the architecture, functionality, and operation of a possible implementation of the software for non-invasive continuous adaptive tuning of digitally controlled switched mode power supply based on measured dynamic response. In this regard, each block represents a module, segment, or portion of code, which comprises one or more executable instructions for implementing the specified logical function(s). It should also be noted that in some alternative implementations, the functions noted in the blocks may occur out of the order noted in FIG. 8. For example, two blocks shown in succession in FIG. 8 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured media.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured media.

Although the present disclosure has been described in detail, it should be understood that various changes, substitutions and alterations can be made thereto without departing from the spirit and scope of the disclosure as defined by the appended claims.

Therefore, at least the following is claimed:

1. A system comprising:
a switch mode power supply (SMPS) controller; and
an adjustable compensator configured to continuously receive time domain information based on a measured transient of an output voltage of an SMPS controlled by the SMPS controller and to continuously send a compensation signal to the SMPS controller to compensate for the transient on the output voltage;
further comprising a startup timing module configured to provide initial compensation parameters to the adjustable compensator.

2. The system of claim 1, wherein the initial compensation parameters are provided based on at least one of $\omega_0$ and Q factor information of the output voltage.

3. The system of claim 2, wherein the $\omega_0$ and Q factor information is provided by an analog to digital converter.

4. A method comprising:
providing an output voltage with a switch mode power supply (SMPS), the SMPS comprising an SMPS controller;
continuously receiving information related to time domain transients on the output voltage; and
sending an adjustable compensation signal to the SMPS controller to continuously adjust for the transients on the output voltage;
further comprising providing initial compensation parameters to an adjustable compensator that provides the adjustable compensation signal.

5. The method of claim 4, further comprising providing the initial compensation parameters based on at least one of $\omega_0$ and Q factor information of the output voltage.

6. The method of claim 5, further comprising providing the $\omega_0$ and Q factor information by an analog to digital converter.

* * * * *